(12) United States Patent
Li et al.

(10) Patent No.: US 11,470,280 B2
(45) Date of Patent: Oct. 11, 2022

(54) GPS-BASED TARGET TRACKING SYSTEM, METHOD AND DOME CAMERA

(71) Applicant: Hangzhou Hikvision Digital Technology Co., Ltd., Zhejiang (CN)

(72) Inventors: Yong Li, Zhejiang (CN); Haishan Jin, Zhejiang (CN); Wei Wang, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/285,010

(22) PCT Filed: Nov. 18, 2019

(86) PCT No.: PCT/CN2019/119234
§ 371 (c)(1),
(2) Date: Apr. 13, 2021

(87) PCT Pub. No.: WO2020/114231
PCT Pub. Date: Jun. 11, 2020

(65) Prior Publication Data
US 2021/0400238 A1     Dec. 23, 2021

(30) Foreign Application Priority Data

Dec. 6, 2018    (CN) .......................... 201811485189.2

(51) Int. Cl.
*H04N 7/18*    (2006.01)
*G01S 19/48*    (2010.01)
(Continued)

(52) U.S. Cl.
CPC .............. *H04N 7/18* (2013.01); *G01S 19/485* (2020.05); *G06T 7/292* (2017.01); *H04N 5/23296* (2013.01); *G06T 2207/30232* (2013.01)

(58) Field of Classification Search
None
See application file for complete search history.

(56) References Cited

U.S. PATENT DOCUMENTS 9,672,627 B1 * 6/2017 Ramaswamy .......... G06T 7/292
9,781,565 B1 * 10/2017 Folco .................... H04W 4/029
(Continued)

FOREIGN PATENT DOCUMENTS

CN    101650570 A  *  2/2010
CN    101950426 A     1/2011
(Continued)

*Primary Examiner* — Stefan Gadomski
(74) *Attorney, Agent, or Firm* — Bret E. Field; Bozicevic, Field & Francis LLP (57) ABSTRACT

Disclosed are GPS-based target tracking system, method and dome camera. The system comprises: a first camera and a second camera. The first camera obtains GPS coordinate of a target during the tracking of the target and sends the GPS coordinates to the second camera. The second camera adjusts a shooting angle of the second camera according to the GPS coordinates, and tracks the target after detecting the target in a second monitoring image shot by the second camera. Therefore, in the scheme, if the target moves out of the monitoring range of the first camera, the second camera continues to track the target, namely the tracking range of the target is expanded through linkage of the plurality of cameras.

13 Claims, 2 Drawing Sheets

(51) Int. Cl.
*H04N 5/232* (2006.01)
*G06T 7/292* (2017.01)

(56) References Cited

U.S. PATENT DOCUMENTS

| | | | | |
|---|---|---|---|---|
| 10,091,464 | B2* | 10/2018 | Baxter | G08B 13/19608 |
| 10,623,705 | B2* | 4/2020 | Vaziri | G06F 3/013 |
| 11,017,537 | B2* | 5/2021 | Togashi | H04N 7/181 |
| 2002/0030741 | A1* | 3/2002 | Broemmelsiek | G01S 5/16 |
| | | | | 348/172 |
| 2005/0057653 | A1* | 3/2005 | Maruya | H04N 7/181 |
| | | | | 348/E7.086 |
| 2006/0181612 | A1* | 8/2006 | Lee | H04N 5/23206 |
| | | | | 348/E7.086 |
| 2007/0035627 | A1* | 2/2007 | Cleary | H04N 21/4223 |
| | | | | 348/E7.086 |
| 2007/0039030 | A1* | 2/2007 | Romanowich | G08B 13/19608 |
| | | | | 348/E7.071 |
| 2008/0279421 | A1* | 11/2008 | Hamza | G06T 7/285 |
| | | | | 382/103 |
| 2009/0268033 | A1* | 10/2009 | Ukita | H04N 7/181 |
| | | | | 348/169 |
| 2009/0324020 | A1* | 12/2009 | Hasebe | G06V 10/993 |
| | | | | 382/115 |
| 2010/0134627 | A1* | 6/2010 | Yen | G06V 20/52 |
| | | | | 348/159 |
| 2012/0218376 | A1* | 8/2012 | Athan | H04N 5/23296 |
| | | | | 348/36 |
| 2013/0162852 | A1* | 6/2013 | Boyle | G06F 3/033 |
| | | | | 348/211.99 |
| 2014/0085479 | A1* | 3/2014 | Haas | G06Q 10/08 |
| | | | | 348/E7.085 |
| 2014/0267775 | A1* | 9/2014 | Lablans | G06T 7/246 |
| | | | | 348/169 |
| 2014/0336848 | A1* | 11/2014 | Saund | G06V 10/255 |
| | | | | 701/3 |
| 2015/0172604 | A1* | 6/2015 | Kim | H04N 5/247 |
| | | | | 348/159 |
| 2015/0235367 | A1* | 8/2015 | Langer | G06T 7/80 |
| | | | | 348/135 |
| 2015/0294140 | A1* | 10/2015 | Miyano | G06V 40/23 |
| | | | | 382/103 |
| 2016/0092736 | A1* | 3/2016 | Mai | G06V 40/10 |
| | | | | 382/103 |
| 2016/0314596 | A1* | 10/2016 | Yu | G09B 19/0038 |
| 2017/0177946 | A1* | 6/2017 | Citerin | G06V 10/462 |
| 2017/0178345 | A1 | 6/2017 | Pham | |
| 2017/0254906 | A1* | 9/2017 | Gowda | G01S 19/43 |
| 2017/0311574 | A1* | 11/2017 | Swan | G06V 40/20 |
| 2017/0323458 | A1* | 11/2017 | Lablans | H04N 7/18 |
| 2018/0018508 | A1* | 1/2018 | Tusch | G06V 40/20 |
| 2018/0061040 | A1* | 3/2018 | Beery | E02F 9/264 |
| 2018/0077355 | A1* | 3/2018 | Kouno | G08B 25/00 |
| 2018/0189600 | A1* | 7/2018 | Astrom | G06V 20/40 |
| 2018/0204331 | A1* | 7/2018 | Omari | G06T 7/248 |
| 2019/0089923 | A1* | 3/2019 | Katano | G06K 9/6247 |
| 2019/0104161 | A1* | 4/2019 | Meganathan | H04L 65/1069 |
| 2019/0137597 | A1* | 5/2019 | Glover | G01S 1/00 |
| 2019/0163974 | A1* | 5/2019 | Ding | G06T 7/292 |
| 2019/0168870 | A1* | 6/2019 | Li | B64C 39/024 |
| 2019/0244498 | A1* | 8/2019 | Dumas | G08B 21/0272 |
| 2019/0258864 | A1* | 8/2019 | Lee | G06T 11/206 |
| 2020/0114836 | A1* | 4/2020 | Day | B60J 10/80 |

FOREIGN PATENT DOCUMENTS

| | | | | | |
|---|---|---|---|---|---|
| CN | 102176246 | A | | 9/2011 | |
| CN | 107896315 | A | * | 4/2018 | H04N 5/268 |
| CN | 107920232 | A | * | 4/2018 | G01S 19/42 |
| CN | 108574822 | A | | 9/2018 | |
| KR | 20060112721 | A | * | 11/2006 | |
| KR | 20090011826 | A | | 2/2009 | |
| KR | 101126929 | B1 | * | 3/2012 | |
| KR | 101372327 | B1 | * | 3/2014 | |
| KR | 20150031530 | A | * | 3/2015 | |
| KR | 20160080583 | A | | 7/2016 | |
| KR | 1794311 | B1 | * | 11/2017 | H04N 13/0203 |
| KR | 101794311 | B1 | * | 11/2017 | |
| RU | 2600540 | C2 | * | 10/2016 | G06K 9/00362 |
| TR | 201510628 | A | * | 3/2017 | |
| WO | WO-2014069812 | A1 | * | 5/2014 | G08B 13/19643 |
| WO | WO-2017197174 | A1 | * | 11/2017 | G01S 1/00 |

\* cited by examiner

GPS-BASED TARGET TRACKING SYSTEM, METHOD AND DOME CAMERA

The present application claims the priority to a Chinese patent application No. 201811485189.2, filed with the China National Intellectual Property Administration on Dec. 6, 2018 and entitled "GPS-based target tracking system, method and dome camera", which is incorporated herein by reference in its entirety.

TECHNICAL FIELD

The application relates to the technical field of security, in particular to a GPS-based target tracking system, method and dome camera.

BACKGROUND

In some scenes, monitoring targets such as vehicles and people can be tracked through monitoring images shot by cameras. The technical scheme may comprise: detecting a to-be-tracked monitoring target in the N-th frame image, determining positions of the monitoring target in the (N+1)-th frame image and subsequent images through a target tracking algorithm, and converting the positions into a Global Positioning System (GPS) coordinates. As such, GPS coordinates of the monitoring target can be continuously acquired, and thus the monitoring target can be tracked.

However, the monitoring range of a camera is limited. In above solution, once the monitoring target moves out of the monitoring range of the camera, the tracking of the monitoring target is ceased. Therefore, the solution has a small tracking range for the monitoring target.

SUMMARY

Embodiments of the present application provide a GPS-based target tracking system, method and dome camera, so as to improve the tracking range.

An embodiment of the present application provides a GPS-based target tracking system, comprising: a first camera and a second camera;

the first camera is configured for determining a to-be-tracked target in a first monitoring image shot by the first camera, tracking the to-be-tracked target, obtaining GPS coordinates of the to-be-tracked target during the tracking, and sending the GPS coordinates of the to-be-tracked target to the second camera; and the second camera is configured for adjusting a shooting angle according to received GPS coordinates of the to-be-tracked target, and tracking the to-be-tracked target after detecting the to-be-tracked target in a second monitoring image shot by the second camera.

In one embodiment, the first camera is configured for:
converting image coordinates of the to-be-tracked target in the first monitoring image into the GPS coordinates of the to-be-tracked target; or converting PT coordinates of the first camera at the time of capturing the to-be-tracked target into the GPS coordinates of the to-be-tracked target.

In one embodiment, the first camera is configured for:
obtaining the PT coordinates to capture the to-be-tracked target, and taking the P coordinate of the PT coordinates as a first P coordinate and taking the T coordinate of the PT coordinates as a first T coordinate;

determining a horizontal angle between the to-be-tracked target and a specified direction based on the first P coordinate;

calculating a horizontal distance between the to-be-tracked target and the first camera based on the first T coordinate and the height of the first camera;

calculating, according to the horizontal angle and the horizontal distance, a longitudinal distance and a latitudinal distance between the to-be-tracked target and the first camera through trigonometric functions; and calculating the GPS coordinates of the to-be-tracked target based on the longitude and latitude of the first camera, and the longitudinal distance and latitudinal distance.

In one embodiment, the first camera is configured for:
predicting a camera by which the to-be-tracked target is to pass based on the GPS coordinates of the to-be-tracked target obtained during the tracking, and taking the predicted camera as the second camera; and sending the GPS coordinates of the to-be-tracked target to the second camera.

In one embodiment, the second camera is a dome camera which is configured for:
determining PT coordinates of the dome camera at the time of capturing the to-be-tracked target according to received GPS coordinates of the to-be-tracked target; and adjusting a shooting angle of the dome camera based on the PT coordinates.

In one embodiment, the dome camera is configured for:
calculating a longitudinal distance and a latitudinal distance between the dome camera and the to-be-tracked target according to the GPS coordinates of the to-be-tracked target and the GPS coordinates of the dome camera;

calculating a horizontal distance between the to-be-tracked target and the dome camera according to the longitudinal distance and latitudinal distance;

calculating a horizontal angle between the to-be-tracked target and a specified direction through trigonometric functions according to the longitudinal distance and latitudinal distance;

determining the P coordinate of the dome camera according to the horizontal angle; and calculating the T coordinates of the dome camera according to the horizontal distance and the height of the dome camera.

In one embodiment, the system further comprises: a server;

the server is configured for sending attribute information of the to-be-tracked target to the first camera;

the first camera is configured for determining, based on received attribute information, the to-be-tracked target in the first monitoring image shot by the first camera; and sending the attribute information to the second camera; and the second camera is configured for detecting, based on the received attribute information, the to-be-tracked target in the second monitoring image shot by the second camera.

In one embodiment, the server is further configured for:
predicting a camera by which the to-be-tracked target is to pass based on a pre-acquired historical trajectory of the to-be-tracked target; sending the attribute information of the to-be-tracked target to the predicted camera; or sending the attribute information of the to-be-tracked target to cameras managed by the server; or sending the attribute information of the to-be-tracked target to a specified camera managed by the server;

wherein, each of the predicted camera, the cameras, and the specified camera comprises the first camera.

In one embodiment, the first camera is further configured for:

sending the GPS coordinates of the to-be-tracked target obtained during the tracking of the to-be-tracked target to the server; and the server is further configured for:

predicting a camera by which the to-be-tracked target is to pass based on the GPS coordinates of the to-be-tracked target and taking the predicted camera as the second camera; and sending the GPS coordinates of the to-be-tracked target to the second camera.

In one embodiment, the system further comprises: a third camera;

the second camera is further configured for obtaining GPS coordinates of the to-be-tracked target during the tracking of the to-be-tracked target, and sending the GPS coordinates of the to-be-tracked target to the third camera;

the third camera is configured for adjusting a shooting angle according to received GPS coordinates of the to-be-tracked target, and tracking the to-be-tracked target after detecting the to-be-tracked target in a monitoring image shot by the third camera.

An embodiment of the present application provides a GPS-based target tracking method, comprising:

determining a to-be-tracked target in a first monitoring image shot by a first camera;

controlling the first camera to track the to-be-tracked target, and to obtain GPS coordinates of the to-be-tracked target during the tracking;

predicting a camera by which the to-be-tracked target is to pass based on the GPS coordinates of the to-be-tracked target obtained during the tracking, and taking the predicted camera as a second camera; and sending the GPS coordinates of the to-be-tracked target to the second camera so that the second camera tracks the to-be-tracked target according to the GPS coordinates of the to-be-tracked target.

In one embodiment, determining a to-be-tracked target in a first monitoring image shot by a first camera comprises:

receiving attribute information of the to-be-tracked target sent by a server or a camera other than the first camera; and determining the to-be-tracked target in the first monitoring image based on the attribute information;

after predicting a camera by which the to-be-tracked target is to pass based on the GPS coordinates of the to-be-tracked target obtained during the tracking, and taking the predicted camera as a second camera; the method further comprises:

sending the attribute information to the second camera so that the second camera detects, based on the received attribute information, the to-be-tracked target in a second monitoring image shot by the second camera.

In one embodiment, obtaining GPS coordinates of the to-be-tracked target during the tracking comprises:

obtaining image coordinates of the to-be-tracked target in the first monitoring image during the tracking; converting the image coordinates into the GPS coordinates of the to-be-tracked target; or obtaining PT coordinates of the first camera at the time of capturing the to-be-tracked target during the tracking, and converting the PT coordinates into the GPS coordinates of the to-be-tracked target.

In one embodiment, converting the PT coordinates into the GPS coordinates of the to-be-tracked target comprises:

obtaining the PT coordinates of the first camera at the time of capturing the to-be-tracked target, and taking the P coordinates of the PT coordinate as a first P coordinate and taking the T coordinate of the PT coordinates as a first T coordinate;

determining a horizontal angle between the to-be-tracked target and a specified direction based on the first P coordinate;

calculating a horizontal distance between the to-be-tracked target and the first camera based on the first T coordinate and the height of the first camera;

calculating, according to the horizontal angle and the horizontal distance, a longitudinal distance and a latitudinal distance between the to-be-tracked target and the first camera through trigonometric functions; and calculating the GPS coordinates of the to-be-tracked target based on the longitude and latitude of the first camera, and the longitudinal distance and latitudinal distance.

In one embodiment, controlling the first camera to track the to-be-tracked target comprises:

receiving attribute information of the to-be-tracked target sent by a server or a camera other than the first camera;

determining PT coordinates of the first camera of capturing the to-be-tracked target according to received GPS coordinates of the to-be-tracked target; and adjusting a shooting angle of the first camera based on the PT coordinates.

In one embodiment, determining PT coordinates of the first camera at the time of capturing the to-be-tracked target according to received GPS coordinates of the to-be-tracked target comprises:

calculating a longitudinal distance and a latitudinal distance between the first camera and the to-be-tracked target according to the GPS coordinates of the to-be-tracked target and GPS coordinates of the first camera that captures the to-be-tracked target;

calculating a horizontal distance between the to-be-tracked target and the first camera according to the longitudinal distance and latitudinal distance;

calculating a horizontal angle between the to-be-tracked target and a specified direction through trigonometric functions according to the longitudinal distance and latitudinal distance;

determining the P coordinate of the first camera according to the horizontal angle;

calculating the T coordinate of the first camera according to the horizontal distance and the height of the first camera.

An embodiment of the application also provides a dome camera, comprising:

an image acquirer configured for shooting monitoring images;

a memory configured for storing a computer program; and a processor configured for implementing any one of the above-mentioned GPS-based target tracking methods when executing the program stored in the memory.

In the embodiment of the present application, a first camera obtains GPS coordinates of a target during the tracking of the target and sends the GPS coordinates to a second camera; and the second camera adjusts the shooting angle of the second camera according to the GPS coordinates, and tracks the target after detecting the target in a second monitoring image shot by the second camera. Therefore, in the solution, if the target moves out of the monitoring range of the first camera, the second camera continues to track the target. In this way, the tracking range of the target is expanded through linkage of a plurality of cameras.

Obviously, it is not necessary for any product or method according to the present application to achieve all of the above-described advantages at the same time.

BRIEF DESCRIPTION OF THE DRAWINGS

In order to more clearly explain the technical solution in the embodiment of this application and the prior art, the following will briefly introduce the drawings that need to be used in the description of the embodiments and the prior art. It is obvious that the drawings described below are only some embodiments of the present application. For those skilled in the art, other drawings can be obtained according to the drawings without paying creative work.

DETAILED DESCRIPTION

The technical solutions in the embodiments of the present application will be described clearly and completely with reference to the drawings in the embodiments of the present application, and it is obvious that the described embodiments are only some embodiments of the present application, and not all embodiments. All other embodiments obtained by a person of ordinary skill in the art based on the embodiments in the present application without making any creative effort belong to the protection scope of the present application.

In order to solve the technical problem, the embodiment of the application provides a GPS-based target tracking system, method and dome camera. First, a detailed description will be given of the GPS-based target tracking system according to the embodiments of the present application.

Figure 1:
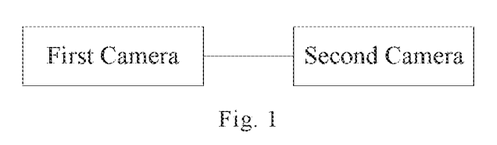
FIG. 1 is a schematic structural diagram of a first GPS-based target tracking system according to an embodiment of the present application.

FIG. 1 is a schematic structural diagram of a first GPS-based target tracking system according to an embodiment of the present application, comprising: a first camera and a second camera.

The first camera is configured for determining a to-be-tracked target in a first monitoring image shot by the first camera, controlling the first camera to track the to-be-tracked target, to obtain GPS coordinates of the to-be-tracked target during the tracking, and to send the GPS coordinates of the to-be-tracked target to the second camera.

The second camera is configured for adjusting a shooting angle of the second camera according to received GPS coordinates of the to-be-tracked target, and tracking the to-be-tracked target after detecting the to-be-tracked target in a second monitoring image shot by the second camera.

In the embodiment of the present application, the first camera obtains the GPS coordinates of the target during the tracking of the target and sends the GPS coordinates to the second camera; and the second camera adjusts the shooting angle of the second camera according to the GPS coordinates, and tracks the target after detecting the target in a second monitoring image shot by the second camera. Therefore, in the solution, if the target moves out of the monitoring range of the first camera, the second camera continues to track the target. As such, the tracking range of the target is expanded through linkage of the plurality of cameras.

For ease of description, a camera that tracks a target first is referred to as a first camera, and a camera that tracks the target later is referred to as a second camera; the monitoring image shot by the first camera is referred to as a first monitoring image, and the monitoring image shot by the second camera is referred to as a second monitoring image. The first camera and the second camera can be dome cameras.

For example, the target is a vehicle traveling on a road A. In the traveling direction of the vehicle, the camera located behind the first camera is the second camera. For example, the order of the cameras may be set in advance, and the first camera, the second camera, and the like may be specified in the set order.

In one case, the first camera can determine the to-be-tracked target in the first monitoring image shot by the first camera according to a user instruction. For example, the first camera can present the first monitoring image shot by the first camera to the user, and the user clicks to select the to-be-tracked target in the first monitoring image. As another example, assuming that the to-be-tracked target is a vehicle, the user can input a license plate number of the to-be-tracked target, the first camera detects whether the license plate number exists in the first monitoring image shot by the first camera. If the license plate number exists, the vehicle corresponding to the license plate number is taken as the to-be-tracked target.

Figure 2:
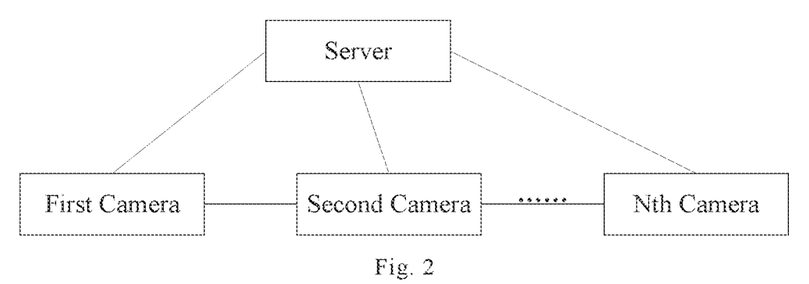
FIG. 2 is a schematic structural diagram of a second GPS-based target tracking system according to an embodiment of the present application.

In another case, referring to FIG. 2, the system comprises a server and a plurality of cameras, that is, a first camera, a second camera . . . an N-th camera, wherein N is a positive integer greater than 2. The server can extract the attribute information of the to-be-tracked target and send the attribute information to the first camera, so that the first camera can determine the to-be-tracked target in the first monitoring image shot by the first camera based on the received attribute information, and send the attribute information to the second camera. The second camera can also detect the to-be-tracked target in a second monitoring image shot by the second camera based on the received attribute information.

For example, the to-be-tracked target is a vehicle. The attribute information can be a license plate number. In another example, the to-be-tracked target is a person. The attribute information can be a face feature or a clothing feature. The present disclosure is not limited in this aspect.

In this implementation, after extracting the attribute information of the to-be-tracked target, the server sends the attribute information to one camera. The camera then sends in turn the attribute information to the next camera for tracking the to-be-tracked target. The next camera then continues to send the attribute information to the next camera for tracking the to-be-tracked target, and so on. In this way, each camera can detect the to-be-tracked target in the monitoring image shot by the camera based on the received attribute information.

In one implementation, the server can predict a camera by which the to-be-tracked target is to pass based on a pre-acquired historical trajectory of the to-be-tracked target; and send the attribute information of the to-be-tracked target to the predicted camera.

For example, assuming that the to-be-tracked target is a vehicle A. The server acquires a historical trajectory of the vehicle A in advance, wherein the historical trajectory indicates that the movement trajectories of the vehicle A are approximately the same from 8 am to 9 am in the morning on weekdays, noted as trajectory X. Assuming that the current time is five past 8 o 'clock in the morning on weekdays, the server predicts that the next camera by which the vehicle A is to pass is the camera 1 according to the track X, and sends the attribute information of the vehicle A to the camera 1. The camera 1 detects the vehicle A in the first monitoring image shot by the camera based on the received attribute information, and controls its pan tilt to track the vehicle A.

In another implementation, the server can also send attribute information of the to-be-tracked target to cameras managed by the server. In this implementation, the server broadcasts the attribute information of the to-be-tracked target to cameras, and the cameras determine whether the to-be-tracked target enters the monitoring range of the camera.

Alternatively, the server can send the attribute information of the to-be-tracked target to a specified camera managed by the server.

For example, some cameras managed by the server, for example, a dome camera, can track a target; while other cameras with fixed positions and angles cannot track the target. Alternatively, some of the cameras support the tracking function, while other cameras do not. In this case, the server can transmit the attribute information of the to-be-tracked target only to the cameras that can track the target, that is, the above-described "a specified camera".

Each of the predicted camera, cameras, and the specified camera comprises the first camera. Of course, it is also possible to each comprise the above-mentioned second camera, which is all reasonable.

As described above, each camera can detect the to-be-tracked target in a monitoring image shot by the camera based on received attribute information. The following description is provided with reference to the example in which a first camera and a second camera as examples.

The first camera can identify each candidate target in the first monitoring image and extract attribute information of each candidate target, match the attribute information of each candidate target with the received attribute information, and determine the candidate target as the to-be-tracked target if the matching degree is greater than a first preset threshold.

Similarly, the second camera can identify each candidate target in the second monitoring image, extract attribute information of each candidate target, match the attribute information of each candidate target with the received attribute information, and determine the candidate target as the to-be-tracked target if the matching degree is greater than a second preset threshold.

The first preset threshold and the second preset threshold can be the same or different, and specific values are not limited.

In the embodiment of the application, the first camera obtains GPS coordinates of the to-be-tracked target during the tracking of the to-be-tracked target. In one case, the GPS coordinates of the to-be-tracked target can be continuously obtained during the tracking. For example, the GPS coordinates of the to-be-tracked target can be obtained once every second or every millisecond. The specific time interval is not limited.

There are various ways for the first camera to obtain GPS coordinates of the to-be-tracked target. In one implementation, the image coordinates of the to-be-tracked target in the first monitoring image can be converted into GPS coordinates of the to-be-tracked target.

For example, the mapping relationship between the image coordinate system and the GPS coordinate system can be defined in advance. The image coordinates of the to-be-tracked target are converted into the GPS coordinates according to the mapping relationship.

In another implementation, PT (Pan/Tilt, a pan tilt moves in a left or right/up or down way) coordinates of the first camera at the time of capturing the to-be-tracked target can be converted into the GPS coordinates of the to-be-tracked target. There are various ways to convert PT coordinates into GPS coordinates, and a new conversion method is proposed in the embodiment of the present application.

The conversion method can comprise: obtaining the PT coordinates at the time of capturing the to-be-tracked target, and taking the P coordinate of the PT coordinates as a first P coordinate and taking the T coordinate of the PT coordinates as a first T coordinate; determining a horizontal angle between the to-be-tracked target and a specified direction based on the first P coordinate; calculating a horizontal distance between the to-be-tracked target and the first camera based on the first T coordinate and the height of the first camera; calculating, according to the horizontal angle and the horizontal distance, a longitudinal distance and a latitudinal distance between the to-be-tracked target and the first camera through trigonometric functions; and calculating the GPS coordinates of the to-be-tracked target based on the longitude and latitude of the first camera, and the longitudinal distance and latitudinal distance.

For ease of description, in the conversion method, the first camera is referred to as a dome camera. The specified direction can be north, south, east, or west, and is not limited specifically.

In the conversion method, the P coordinate of the dome camera, when it points to the specified direction, can be obtained through an electronic compass of the dome camera and is used as a second P coordinate; and the difference between the first P coordinate and the second P coordinate can be calculated and taken as the horizontal angle between the to-be-tracked target and the specified direction.

The P coordinate of the dome camera when pointing in the north, the south, the east, the west, and the like, can be acquired through the electronic compass of the dome camera. For the purpose of distinction, this P coordinate is referred to as a second P coordinate. The difference between the first P coordinate and the second P coordinate is the horizontal angle between the to-be-tracked target and the specified direction.

Figure 3:
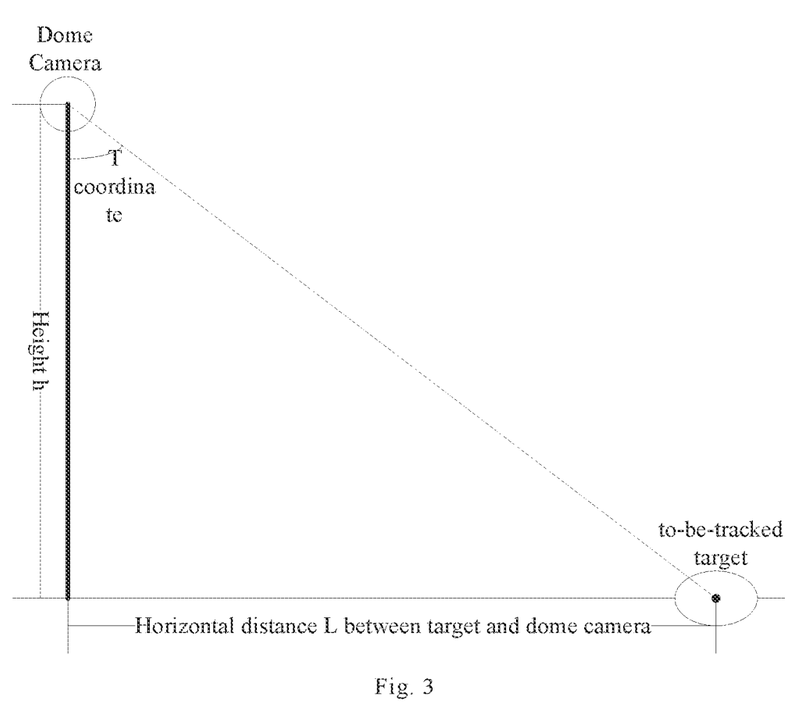
FIG. 3 is a schematic diagram of coordinate transformation in a vertical direction in an embodiment of the present application.

In the conversion method, the product of the tangent of the first T coordinate and the height of the dome camera can be calculated as the horizontal distance between the to-be-tracked target and the dome camera. Referring to FIG. 3, tan T*h=L, h is the height of the dome camera, and L is the horizontal distance between the to-be-tracked target and the dome camera. The horizontal distance is the distance between the dome camera and the to-be-tracked target under the condition that the heights of the dome camera and the to-be-tracked target are the same.

If the specified direction is north, the product of the sine of the horizontal angle and the horizontal distance is calculated and taken as the longitudinal distance between the to-be-tracked target and the dome camera; and the product of the cosine of the horizontal angle and the horizontal distance is calculated and taken as the latitudinal distance between the to-be-tracked target and the dome camera.

Figure 4:
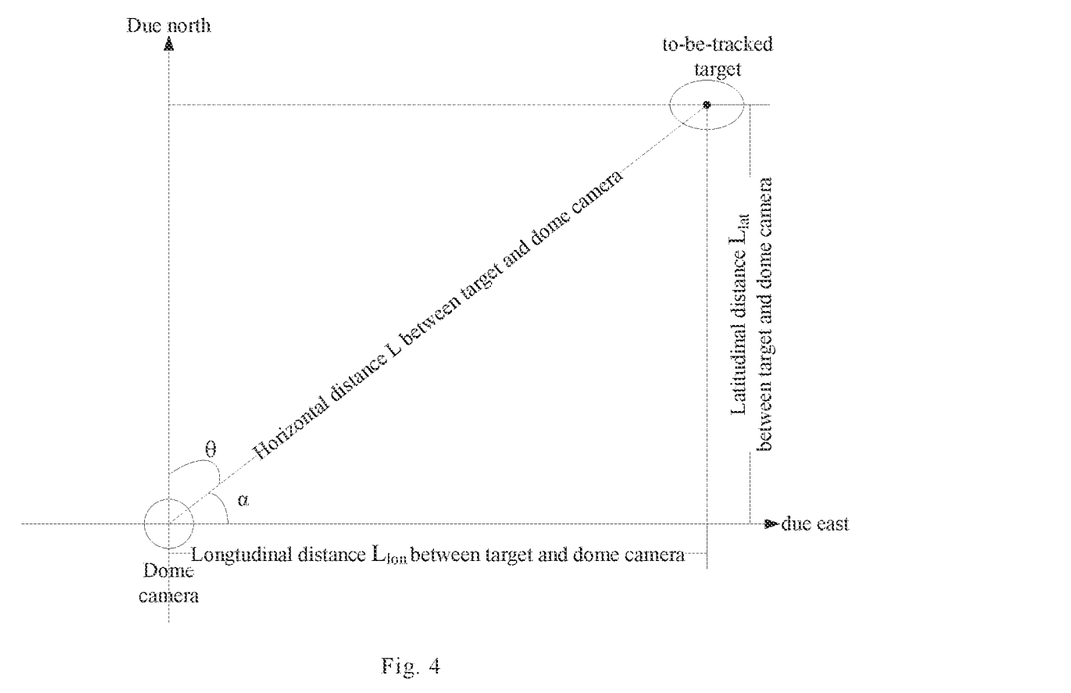
FIG. 4 is a schematic diagram of coordinate transformation in a horizontal direction in an embodiment of the present application.

Referring to FIG. 4, FIG. 4 is a top view of the dome camera, and does not show the height of the dome camera. As can be seen from FIG. 4, $L*\sin\theta=L_{lon}$, $L*\cos\theta=L_{lat}$, L is the horizontal distance obtained by the above calculation, $\theta$ is the horizontal angle between the to-be-tracked target and the north direction, $L_{lon}$ is the longitudinal distance between the to-be-tracked target and the dome camera, and $L_{lat}$ is the latitudinal distance between the to-be-tracked target and the dome camera.

If the specified direction is east, the product of the cosine of the horizontal angle and the horizontal distance is calculated and taken as the longitudinal distance between the to-be-tracked target and the dome camera; and the product of the sine of the horizontal angle and the horizontal distance is calculated and taken as the latitudinal distance between the to-be-tracked target and the dome camera.

In this case, the horizontal angle between the to-be-tracked target and the east direction is α in FIG. 4, L*sin α=$L_{lon}$, L*cos α=$L_{lat}$.

Alternatively, the specified direction is west or south, and the specific calculation process is similar and is not described again.

The dome camera is usually provided with a GPS positioning device through which GPS coordinates of the dome camera can be obtained. The GPS coordinate comprises a longitude and a latitude. With the longitude and latitude of the dome camera, and longitudinal and latitudinal distances between the dome camera and the to-be-tracked target, the longitude and latitude of the to-be-tracked target can be calculated, and the GPS coordinates of the to-be-tracked target is also obtained.

In one implementation, the first camera can predict a camera by which the to-be-tracked target is to pass as a second camera based on the GPS coordinates of the to-be-tracked target obtained during the tracking; and sending the GPS coordinates of the to-be-tracked target to the second camera.

The camera by which the to-be-tracked target is to pass can be a next camera by which the to-be-tracked target is to pass. It is assumed that the first camera is an N-th camera by which the to-be-tracked target is to pass, and the second camera can be an (N+1)-th camera, or can also be an (N+2)-th camera, an (N+3)-th camera, and the like by which the to-be-tracked target is to passes. Embodiments are not limited in this aspect.

In one case, the first camera can determine a moving speed and a moving direction of the to-be-tracked target based on the GPS coordinates of the to-be-tracked target obtained during the tracking; and predict the camera by which the to-be-tracked target is to pass as a second camera based on the moving speed and the moving direction.

For example, the system according to the embodiment of the present application can comprise a plurality of cameras, and these cameras obtain the positions of the other cameras in advance, so that the first camera can predict a camera by which the to-be-tracked target is to pass based on the moving speed and the moving direction of the to-be-tracked target.

Alternatively, in another case, the first camera can predict a camera by which the to-be-tracked target is to pass as the second camera based on the current road condition and the moving speed of the to-be-tracked target.

For example, the to-be-tracked target is a vehicle traveling on a road without a branch. The camera by which the vehicle is to pass can be predicted only based on the moving speed of the vehicle and the direction of the road.

In one implementation, the first camera can send the continuously obtained GPS coordinates of the to-be-tracked target to the second camera after predicting the second camera and before the to-be-tracked target moving out of the monitoring range of the first camera.

For example, assuming that the first camera predicts the second camera at time X, the to-be-tracked target moves out of the monitoring range of the first camera at time Y, and the first camera obtains the GPS coordinates of the to-be-tracked target once per second during the tracking of the to-be-tracked target. In this case, the first camera can send the GPS coordinate to the second camera every time the GPS coordinates of the to-be-tracked target are acquired during the time period from X to Y.

If the system further comprises a server, as another implementation, the first camera can send the GPS coordinates of the to-be-tracked target obtained during the tracking of the to-be-tracked target by the first camera to the server. The server predicts a camera by which the to-be-tracked target is to pass as a second camera based on the GPS coordinates of the to-be-tracked target; and sends the GPS coordinates of the to-be-tracked target to the second camera.

The process of predicting the second camera by the server is similar to the process of predicting the second camera by the first camera, and is not described again. The server can send the received GPS coordinate of the to-be-tracked target sent by the first camera to the second camera after having predicted the second camera.

In one case, the second camera can be a dome camera, and the second camera can determine PT coordinates of the second camera at the time of shooting the to-be-tracked target according to received GPS coordinates of the to-be-tracked target; and adjust the shooting angle of the camera based on the PT coordinates.

There are various ways to convert GPS coordinates into PT coordinates, and a new conversion method is proposed in the embodiment of the present application, comprising:

calculating a longitudinal distance and a latitudinal distance between the dome camera and the to-be-tracked target according to the GPS coordinates of the to-be-tracked target and the GPS coordinates of the dome camera; calculating a horizontal distance between the to-be-tracked target and the dome camera according to the longitudinal distance and latitudinal distance; calculating a horizontal angle between the to-be-tracked target and a specified direction through trigonometric functions according to the longitudinal distance and latitudinal distance; determining the P coordinate of the dome camera according to the horizontal angle; and calculating the T coordinate of the dome camera according to the horizontal distance and the height of the dome camera.

The horizontal distance is the distance between the dome camera and the to-be-tracked target if they are on the same height. Referring to FIG. 4, if the ground is considered to be flat, the horizontal distance between the to-be-tracked target and the dome camera is calculated by using formula 1:

$$\text{Horizontal distance} = \sqrt{\text{Longitudinal } distance^2 + \text{Latitudinal } distance^2}$$

Alternatively, Haversine function can be used to calculate the horizontal distance between the to-be-tracked target and the dome camera in the following formula:

$$L = 2 \times R \times \arcsin\left(\sqrt{\sin^2\left(\frac{Bw - Aw}{2}\right) + \cos(Aw) \times \cos(Bw) \times \sin^2\left(\frac{Bj - Aj}{2}\right)}\right)$$

In this formula, Aw represents the latitude of the to-be-tracked target, Aj represents the longitude of the to-be-tracked target, Bw represents the latitude of the dome camera, Bj represents the longitude of the dome camera, L represents the horizontal distance between the to-be-tracked target and the dome camera, and R represents the radius of the earth where the dome camera is located.

Alternatively, the ground is considered to be spherical, and the horizontal distance between the to-be-tracked target and the dome camera, that is, the spherical surface distance, is calculated by using a spherical sine and cosine formula. There are various ways to calculate the horizontal distance between the to-be-tracked target and the dome camera, which will not be listed here.

For example, if the specified direction is north, the ratio of the longitudinal distance to the latitudinal distance can be calculated as the tangent of the horizontal angle. The horizontal angle can be calculated through the tangent of the horizontal angle. Referring to FIG. 4, tan θ=the longitudinal distance/the latitudinal distance, and θ represents a horizontal angle between the to-be-tracked target and the north direction.

Alternatively, the specified direction can also be east, in which case, the ratio of the the longitudinal distance to the latitudinal distance can be calculated as the tangent of the horizontal angle; and the horizontal angle is calculated through the tangent of the horizontal angle. Referring to FIG. 4, tan α=the latitudinal distance/the longitudinal distance, and α is a horizontal angle between the to-be-tracked target and the true east direction.

Alternatively, the specified direction can also be west or south, and the specific calculation process is similar to the above and will not be repeated.

The P coordinate of the dome camera can be understood as the angle of the dome camera in the horizontal direction. If the horizontal angle between the dome camera and the specified direction is known, the angle of the dome camera in the horizontal direction can be determined, so that the P coordinate of the dome camera is obtained. The specified direction can be north, etc.

In the conversion method, the ratio of the horizontal distance to the height of the dome camera can be calculated as the tangent of the T coordinate of the dome camera; and the T coordinate of the dome camera can be determined through the tangent of the T coordinate of the dome camera.

Referring to FIG. 3, tan T*h=L, h represents the height of the dome camera, L represents the horizontal distance between the to-be-tracked target and the dome camera, and T represents the T coordinate of the dome camera. The T coordinate of the dome camera can be calculated according to the formula.

Based on the above steps, the second camera can convert the GPS coordinates of the to-be-tracked target into PT coordinates of the dome camera, and adjust the shooting angle of the second camera based on the PT coordinate, so that the second camera can track the target immediately after the to-be-tracked target enters the shooting range of the second camera.

In one implementation, the GPS-based target tracking system further comprises a third camera. The second camera obtains the GPS coordinates of the to-be-tracked target during the tracking of the to-be-tracked target, and sends the GPS coordinates of the to-be-tracked target to the third camera.

As described above, a camera that tracks the target first is referred to as a first camera, and a camera that tracks the target later is referred to as a second camera. In this implementation, after the to-be-tracked target moves out of the monitoring range of the first camera, the second camera can be used as a new first camera, and a third camera can be used as a new second camera, and so on. In this way, new cameras are continuously employed to track the to-be-tracked target until no further camera capable of target tracking is available. Thus, the tracking range of the target is greatly improved.

In the above implementation, the first camera sends the GPS coordinates of the to-be-tracked target to the server, and the server predicts the second camera and sends the GPS coordinates of the to-be-tracked target to the second camera. In this case, the second camera can further send obtained GPS coordinates of the to-be-tracked target to the server, and the server can continue to predict a further camera by which the to-be-tracked target is to pass next as a third camera, and send the GPS coordinates of the to-be-tracked target received from the second camera to the third camera.

The third camera continues to track the to-be-tracked target. In other words, the third camera can adjust the shooting angle according to received GPS coordinates of the to-be-tracked target, and track the to-be-tracked target after detecting the to-be-tracked target in the monitoring image shot by the third camera. This process is similar to the process of tracking the to-be-tracked target by the second camera, and is thus not repeated again.

In one implementation, there can be multiple third cameras. A first third camera adjusts a shooting angle according to received GPS coordinates of the to-be-tracked target, tracks the to-be-tracked target after detecting the to-be-tracked target in a monitoring image shot by the first third camera, obtains GPS coordinates of the to-be-tracked target during the tracking of the to-be-tracked target, and sends the GPS coordinates of the to-be-tracked target to the next third camera.

A further third camera receives the GPS coordinates from the last third camera, adjusts the shooting angle, and tracks the to-be-tracked target after detecting the to-be-tracked target in a monitoring image shot by the further third camera, until the tracking is finished.

In another implementation, there can be multiple third cameras. A first third camera adjusts a shooting angle according to received GPS coordinates of the to-be-tracked target, tracks the to-be-tracked target after detecting the to-be-tracked target in the monitoring image shot by the first third camera, obtains the GPS coordinates of the to-be-tracked target during the tracking of the to-be-tracked target, and sends the GPS coordinates of the to-be-tracked target to the server.

The server sends GPS coordinates of the to-be-tracked target to the next third camera. A further third camera receives the GPS coordinates from the server, adjusts a shooting angle, and tracks the to-be-tracked target after detecting the to-be-tracked target in the monitoring image shot by the further third camera, until the tracking is finished. The further third camera is a third camera other than the first third camera.

In the system according to the embodiment of the application, the first camera obtains GPS coordinates of the target during the tracking of the target and sends the GPS coordinates to the second camera; and the second camera adjusts the shooting angle of the second camera according to the GPS coordinates, and tracks the target after detecting it in the second monitoring image shot by the second camera. Therefore, in the solution, once the target moves out of the monitoring range of the first camera, the second camera continues to track the target. In this way, the tracking range of the target is expanded through linkage of the plurality of cameras.

Corresponding to the above embodiment of system, the embodiment of the application also provides a GPS-based target tracking method, which can be applied to a camera, such as a dome camera, or other electronic devices that are communicatively connected with the camera, such as a server, and the like. The embodiment is not specifically limited in this aspect. In the following description, the method is executed on a first camera, which can be any camera.

Figure 5:
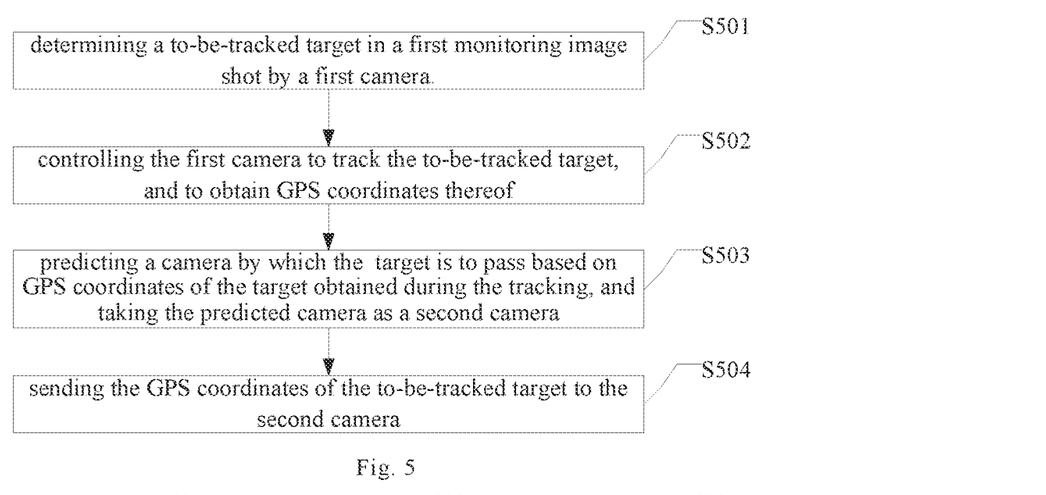
FIG. 5 is a schematic flowchart of a GPS-based target tracking method according to an embodiment of the present application.

FIG. 5 is a schematic flowchart of a GPS-based target tracking method according to an embodiment of the present application, the method comprises:

S501, determining a to-be-tracked target in a first monitoring image shot by a first camera.

For ease of description, the monitoring image shot by the first camera is referred to as a first monitoring image, and the first camera can be a dome camera.

In one case, the first camera can determine the to-be-tracked target in the first monitoring image shot by the first camera according to a user instruction. For example, the first camera can present the first monitoring image shot by the first camera to the user, and the user clicks to select the to-be-tracked target in the first monitoring image. As another example, the to-be-tracked target is a vehicle. The user can input a license plate number of the to-be-tracked target, the first camera detects whether the license plate number exists in the first monitoring image shot by the first camera. If the license plate number exists, the vehicle corresponding to the license plate number is taken as the to-be-tracked target.

In another case, S501 can comprise: receiving attribute information of the to-be-tracked target sent by a server or a camera other than the first camera; and determining the to-be-tracked target in the first monitoring image based on the attribute information;

For example, if the to-be-tracked target is a vehicle, the attribute information can be a license plate number; if the to-be-tracked target is a person, the attribute information can be a face feature or a clothing feature.

For example, the server can extract the attribute information of the to-be-tracked target, and sends the attribute information to a camera. The camera then continues to send the attribute information to the next camera for tracking the to-be-tracked target. The next camera then continues to send the attribute information to the further next camera for tracking the to-be-tracked target, and so on. Further details are omitted. In this way, each camera can receive the attribute information sent by the server or another camera, and detect the to-be-tracked target in the monitoring image shot by each camera based on the received attribute information.

Alternatively, the server can predict a camera by which the to-be-tracked target is to pass based on a historical trajectory of the to-be-tracked target acquired in advance; sending the attribute information of the to-be-tracked target to the predicted camera. Alternatively, the server can also send the attribute information of the to-be-tracked target to all cameras or a specified camera managed by the server.

For example, the first camera can identify each candidate target in the first monitoring image and extract attribute information of each candidate target; and matching the attribute information of each candidate target with the received attribute information, and determining the candidate target as the to-be-tracked target if a matching degree is greater than a first preset threshold.

S502, controlling the first camera to track the to-be-tracked target, and to obtain GPS coordinates of the to-be-tracked target during the tracking.

In one case, the first camera can continuously obtain GPS coordinates of the to-be-tracked target during the tracking of the to-be-tracked target. For example, the GPS coordinate of the to-be-tracked target can be obtained every second or every millisecond. The specific time interval is not limited.

There are various ways to obtain GPS coordinates of the to-be-tracked target during the tracking. In one implementation, image coordinates of the to-be-tracked target in the first monitoring image may be obtained during the tracking; and the image coordinates may be converted into the GPS coordinates of the to-be-tracked target.

For example, the mapping relationship between the image coordinate system and the GPS coordinate system can be pre-established, and the image coordinates of the to-be-tracked target are converted into the GPS coordinates according to the mapping relationship.

In another implementation, PT coordinates of the first camera at the time of shooting the to-be-tracked target during the tracking are obtained, and are then converted into GPS coordinates of the to-be-tracked target.

There are various ways to convert PT coordinates into GPS coordinates, and a new conversion method is proposed in the embodiment of the present application.

The conversion method can comprise: obtaining the PT coordinates of the first camera at the time of capturing the to-be-tracked target, and taking the P coordinates of the PT coordinate as a first P coordinate and taking the T coordinate of the PT coordinates as a first T coordinate; determining a horizontal angle between the to-be-tracked target and a specified direction based on the first P coordinate; calculating a horizontal distance between the to-be-tracked target and the first camera based on the first T coordinate and the height of the first camera; calculating, according to the horizontal angle and the horizontal distance, a longitudinal distance and a latitudinal distance between the to-be-tracked target and the first camera through trigonometric functions; and calculating the GPS coordinates of the to-be-tracked target based on the longitude and latitude of the first camera, and the longitudinal distance and latitudinal distance.

For ease of description, in the conversion method, the first camera is referred to as a dome camera. The specified direction can be north, south, east, or west, and is not limited specifically.

In the conversion method, the product of the tangent of the first T coordinate and the height of the dome camera can be calculated as the horizontal distance between the to-be-tracked target and the dome camera. Referring to FIG. 3, tan T*h=L, h is the height of the dome camera, and L is the horizontal distance between the to-be-tracked target and the dome camera. The horizontal distance is the distance between the dome camera and the to-be-tracked target under the condition that the heights of the dome camera and the to-be-tracked target are the same.

If the specified direction is north, the product of the sine of the horizontal angle and the horizontal distance is calculated and taken as the longitudinal distance between the to-be-tracked target and the dome camera; and the product of the cosine of the horizontal angle and the horizontal distance is calculated and taken as the latitudinal distance between the to-be-tracked target and the dome camera.

Referring to FIG. 4, FIG. 4 is a top view of the dome camera, and does not show the height of the dome camera. As can be seen from FIG. 4, $L*\sin\theta=L_{lon}$, $L*\cos\theta=L_{lat}$, L is the horizontal distance obtained by the above calculation, $\theta$ is the horizontal angle between the to-be-tracked target and the north direction, $L_{lon}$ is the longitudinal distance between the to-be-tracked target and the dome camera, and $L_{lat}$ is the latitudinal distance between the to-be-tracked target and the dome camera.

If the specified direction is east, the product of the cosine of the horizontal angle and the horizontal distance is calculated and taken as the longitudinal distance between the to-be-tracked target and the dome camera; and the product of the sine of the horizontal angle and the horizontal distance is calculated and taken as the latitudinal distance between the to-be-tracked target and the dome camera.

In this case, the horizontal angle between the to-be-tracked target and the east direction is α in FIG. 4, L*sin α=$L_{lon}$, L*cos α=$L_{lat}$.

Alternatively, the specified direction is west or south, and the specific calculation process is similar and is not described again.

The dome camera is usually provided with a GPS positioning device through which GPS coordinates of the dome camera can be obtained. The GPS coordinate comprises a longitude and a latitude. With the longitude and latitude of the dome camera, and longitudinal and latitudinal distances between the dome camera and the to-be-tracked target, the longitude and latitude of the to-be-tracked target can be calculated, and the GPS coordinates of the to-be-tracked target is also obtained.

S503, predicting a camera by which the to-be-tracked target is to pass based on the GPS coordinates of the to-be-tracked target obtained during the tracking, and taking the predicted camera as a second camera The camera by which the to-be-tracked target is to pass can be a next camera by which the to-be-tracked target is to pass. It is assumed that the first camera is an N-th camera by which the to-be-tracked target is to pass, and the second camera can be an (N+1)-th camera, or can also be an (N+2)-th camera, an (N+3)-th camera, and the like by which the to-be-tracked target is to passes. Embodiments are not limited in this aspect.

In one case, the first camera can determine a moving speed and a moving direction of the to-be-tracked target based on the GPS coordinates of the to-be-tracked target obtained during the tracking; and predict the camera by which the to-be-tracked target is to pass as a second camera based on the moving speed and the moving direction.

For example, the first camera may obtain positions of the other cameras in advance, so that the first camera can predict a camera by which the to-be-tracked target is to pass based on the moving speed and the moving direction of the to-be-tracked target.

Alternatively, in another case, the first camera can predict a camera by which the to-be-tracked target is to pass as the second camera based on the current road condition and the moving speed of the to-be-tracked target.

For example, the to-be-tracked target is a vehicle traveling on a road without a branch. The camera by which the vehicle is to pass can be predicted only based on the moving speed of the vehicle and the direction of the road.

S504, sending the GPS coordinates of the to-be-tracked target to the second camera so that the second camera tracks the to-be-tracked target according to the GPS coordinates of the to-be-tracked target.

In one implementation, the first camera can send the continuously obtained GPS coordinates of the to-be-tracked target to the second camera after predicting the second camera and before the to-be-tracked target moving out of the monitoring range of the first camera.

For example, assuming that the first camera predicts the second camera at time X, the to-be-tracked target moves out of the monitoring range of the first camera at time Y, and the first camera obtains the GPS coordinates of the to-be-tracked target once per second during the tracking of the to-be-tracked target. In this case, the first camera can send the GPS coordinate to the second camera every time the GPS coordinates of the to-be-tracked target are acquired during the time period from X to Y.

As described above, for each camera, it can receive the attribute information sent by the server or other cameras, and detect the to-be-tracked target in the monitoring image shot by each camera based on the received attribute information. In one case, after S503, the first camera can send the attribute information of the to-be-tracked target to the second camera. The second camera can adjust the shooting angle of the second camera according to the received GPS coordinate of the to-be-tracked target, and tracks the to-be-tracked target after detecting the to-be-tracked target in the second monitoring image shot by the second camera according to the attribute information.

after receiving the GPS coordinate of the to-be-tracked target sent by the server or a camera other than the second camera, the second camera determines a PT coordinate of the second camera when shooting the to-be-tracked target according to the received GPS coordinate of the to-be-tracked target; and adjusting the shooting angle of the second camera based on the PT coordinate.

There are various ways to convert GPS coordinates into PT coordinates, and a new conversion method is proposed in the embodiment of the present application, comprising:

calculating a longitudinal distance and a latitudinal distance between the dome camera and the to-be-tracked target according to the GPS coordinates of the to-be-tracked target and the GPS coordinates of the dome camera; calculating a horizontal distance between the to-be-tracked target and the dome camera according to the longitudinal distance and latitudinal distance; calculating a horizontal angle between the to-be-tracked target and a specified direction through trigonometric functions according to the longitudinal distance and latitudinal distance; determining the P coordinate of the dome camera according to the horizontal angle; and calculating the T coordinate of the dome camera according to the horizontal distance and the height of the dome camera.

The horizontal distance is the distance between the dome camera and the to-be-tracked target if they are on the same height. Referring to FIG. 4, if the ground is considered to be flat, the horizontal distance between the to-be-tracked target and the dome camera is calculated by using formula 1:

$$\text{Horizontal distance} = \sqrt{\text{Longitudinal } distance^2 + \text{Latitudinal } distance^2}$$

Alternatively, Haversine function can be used to calculate the horizontal distance between the to-be-tracked target and the dome camera in the following formula:

$$L = 2 \times R \times \arcsin\left(\sqrt{\sin^2\left(\frac{Bw - Aw}{2}\right) + \cos(Aw) \times \cos(Bw) \times \sin^2\left(\frac{Bj - Aj}{2}\right)}\right)$$

In this formula, Aw represents the latitude of the to-be-tracked target, Aj represents the longitude of the to-be-tracked target, Bw represents the latitude of the dome camera, Bj represents the longitude of the dome camera, L represents the horizontal distance between the to-be-tracked target and the dome camera, and R represents the radius of the earth where the dome camera is located.

Alternatively, the ground is considered to be spherical, and the horizontal distance between the to-be-tracked target and the dome camera, that is, the spherical surface distance, is calculated by using a spherical sine and cosine formula. There are various ways to calculate the horizontal distance between the to-be-tracked target and the dome camera, which will not be listed here.

For example, if the specified direction is north, the ratio of the longitudinal distance to the latitudinal distance can be calculated as the tangent of the horizontal angle. The horizontal angle can be calculated through the tangent of the horizontal angle. Referring to FIG. 4, tan θ=the longitudinal distance/the latitudinal distance, and θ represents a horizontal angle between the to-be-tracked target and the north direction.

Alternatively, the specified direction can also be east, in which case, the ratio of the the longitudinal distance to the latitudinal distance can be calculated as the tangent of the horizontal angle; and the horizontal angle is calculated through the tangent of the horizontal angle. Referring to FIG. 4, tan α=the latitudinal distance/the longitudinal distance, and α is a horizontal angle between the to-be-tracked target and the true east direction.

Alternatively, the specified direction can also be west or south, and the specific calculation process is similar to the above and will not be repeated.

The P coordinate of the dome camera can be understood as the angle of the dome camera in the horizontal direction. If the horizontal angle between the dome camera and the specified direction is known, the angle of the dome camera in the horizontal direction can be determined, so that the P coordinate of the dome camera is obtained. The specified direction can be true north, etc.

In the conversion method, the ratio of the horizontal distance to the height of the dome camera can be calculated as the tangent of the T coordinate of the dome camera; and the T coordinate of the dome camera can be determined through the tangent of the T coordinate of the dome camera.

Referring to FIG. 3, tan T*h=L, h represents the height of the dome camera, L represents the horizontal distance between the to-be-tracked target and the dome camera, and T represents the T coordinate of the dome camera. The T coordinate of the dome camera can be calculated according to the formula.

In the embodiment of the present application, the first camera obtains the GPS coordinates of the target during the tracking of the target and sends the GPS coordinates to the second camera; and the second camera adjusts the shooting angle of the second camera according to the GPS coordinates, and tracks the target after detecting the target in a second monitoring image shot by the second camera. Therefore, in the solution, if the target moves out of the monitoring range of the first camera, the second camera continues to track the target. As such, the tracking range of the target is expanded through linkage of the plurality of cameras.

Figure 6:
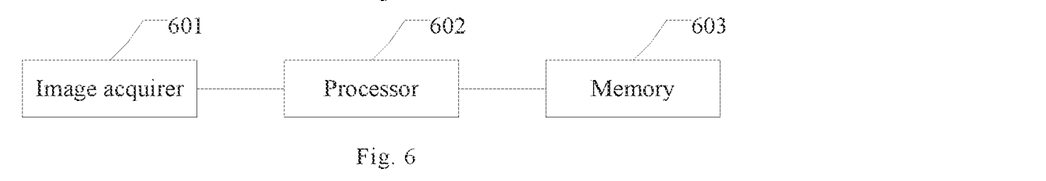
FIG. 6 is a schematic structural diagram of a dome camera according to an embodiment of the present application.

An embodiment of the present application also provides a dome camera, which comprises an image acquirer 601, a processor 602 and a memory 603.

The image acquirer 601 is configured for shooting monitoring images.

The memory 602 is configured for storing a computer program.

The processor 603 is configured for implementing any one of the above-mentioned GPS-based target tracking methods when executing the program stored in the memory 602.

In the embodiment of the present application, the first camera obtains the GPS coordinates of the target during the tracking of the target and sends the GPS coordinates to the second camera; and the second camera adjusts the shooting angle of the second camera according to the GPS coordinates, and tracks the target after detecting the target in a second monitoring image shot by the second camera. Therefore, in the solution, if the target moves out of the monitoring range of the first camera, the second camera continues to track the target. As such, the tracking range of the target is expanded through linkage of the plurality of cameras.

The image acquirer can comprise various components such as a lens and an image sensor, which are not limited specifically.

The Memory can comprise a Random Access Memory (RAM) or a Non-Volatile Memory (NVM), such as at least one disk memory. In one embodiment, the memory can also be at least one memory device located remotely from the processor.

The Processor can be a general-purpose processor, comprising a Central Processing Unit (CPU), a Network Processor (NP), and the like; but also a Digital Signal Processor (DSP), an Application Specific Integrated Circuits (ASIC), a Field Programmable Gate Arrays (FPGA) or other programmable logic devices, discrete Gate or transistor logic devices, discrete hardware components.

It should be noted that, in this document, relational terms such as first and second, and the like are used only to distinguish one entity or action from another entity or action without necessarily requiring or implying any actual such relationship or order between such entities or actions. Also, the terms "comprises," "comprising," or any other variation thereof, are intended to cover a non-exclusive inclusion, such that a process, method, article, or device that comprises a list of elements does not comprise only those elements but can comprise other elements not expressly listed or inherent to such process, method, article, or device. Without further limitation, an element defined by the phrase " comprising an . . ." does not exclude the presence of other identical elements in the process, method, article, or apparatus that comprises the element.

All embodiments in the present description are described in a related manner, and the same and similar parts among the embodiments can be referred to each other, and each embodiment focuses on differences from other embodiments. In particular, method embodiment and dome camera embodiment are described in relative terms that are substantially similar to system embodiment, and the relevant parts can be referred to the part of the description of the system embodiment.

The above description are only preferred embodiments of the present application and should not be taken as limiting the present application, and any modifications, equivalents, improvements and the like made within the spirit and principle of the present application should be included in the protection scope of the present application.

What is claimed is:

1. A target tracking system based on Global Positioning System (GPS) comprising:
    a first camera and a second camera; the first camera is configured for determining a to-be-tracked target in a first monitoring image shot by the first camera, tracking the to-be-tracked target, obtaining GPS coordinates of the to-be-tracked target during the tracking, and sending the GPS coordinates of the to-be-tracked target to the second camera; and
    the second camera is configured for adjusting a shooting angle according to received GPS coordinates of the to-be-tracked target, and tracking the to-be-tracked target after detecting the to-be- tracked target in a second monitoring image shot by the second camera;

wherein, the first camera is further configured for converting Pan/Tilt (PT) coordinates for the first camera to capture the to-be-tracked target into the GPS coordinates of the to-be-tracked target;

and wherein, the first camera is further configured for:

obtaining the PT coordinates to capture the to-be-tracked target, and taking the P coordinate of the PT coordinates as a first P coordinate and taking the T coordinate of the PT coordinates as a first T coordinate;

determining a horizontal angle between the to-be-tracked target and a specified direction based on the first P coordinate;

calculating a horizontal distance between the to-be-tracked target and the first camera based on the first T coordinate and the height of the first camera;

calculating, according to the horizontal angle and the horizontal distance, a longitudinal distance and a latitudinal distance between the to-be-tracked target and the first camera through trigonometric functions; and calculating the GPS coordinates of the to-be-tracked target based on the longitude and latitude of the first camera, and the longitudinal distance and latitudinal distance.

2. The system according to claim 1, wherein, the first camera is further configured for:

predicting a camera by which the to-be-tracked target is to pass based on the GPS coordinates of the to-be-tracked target obtained during the tracking, and taking the predicted camera as the second camera; and sending the GPS coordinates of the to-be-tracked target to the second camera.

3. The system according to claim 1, wherein the second camera is a dome camera configured for:

determining PT coordinates for the dome camera to capture the to-be-tracked target according to received GPS coordinates of the to-be-tracked target; and adjusting a shooting angle of the dome camera based on the PT coordinates.

4. The system according to claim 3, wherein the dome camera is further configured for:

calculating a longitudinal distance and a latitudinal distance between the dome camera and the to-be-tracked target according to the GPS coordinates of the to-be-tracked target and the GPS coordinates of the dome camera;

calculating a horizontal distance between the to-be-tracked target and the dome camera according to the longitudinal distance and latitudinal distance;

calculating a horizontal angle between the to-be-tracked target and a specified direction through trigonometric functions according to the longitudinal distance and latitudinal distance;

determining the P coordinate of the dome camera according to the horizontal angle; and calculating the T coordinates of the dome camera according to the horizontal distance and the height of the dome camera.

5. The system according to claim 1, further comprising: a server, configured for sending attribute information of the to-be-tracked target to the first camera;

the first camera is configured for determining, based on received attribute information, the to-be-tracked target in the first monitoring image shot by the first camera; and sending the attribute information to the second camera; and the second camera is configured for detecting, based on the received attribute information, the to-be-tracked target in the second monitoring image shot by the second camera.

6. The system according to claim 5, wherein the server is further configured for:

predicting a camera by which the to-be-tracked target is to pass based on a pre-acquired historical trajectory of the to-be-tracked target; sending the attribute information of the to-be-tracked target to the predicted camera; or sending the attribute information of the to-be-tracked target to cameras managed by the server; or sending the attribute information of the to-be-tracked target to a specified camera managed by the server;

wherein, each of the predicted camera, the cameras, and the specified camera comprises the first camera.

7. The system according to claim 5, wherein the first camera is further configured for:

sending the GPS coordinates of the to-be-tracked target obtained during the tracking of the to-be-tracked target to the server; and the server is further configured for:

predicting a camera by which the to-be-tracked target is to pass based on the GPS coordinates of the to-be-tracked target and taking the predicted camera as the second camera; and sending the GPS coordinates of the to-be-tracked target to the second camera.

8. The system according to claim 1, further comprising: a third camera;

the second camera is further configured for obtaining GPS coordinates of the to-be-tracked target during the tracking of the to-be-tracked target, and sending the GPS coordinates of the to-be-tracked target to the third camera;

the third camera is configured for adjusting a shooting angle according to received GPS coordinates of the to-be-tracked target, and tracking the to-be-tracked target after detecting the to-be-tracked target in a monitoring image shot by the third camera.

9. A target tracking method based on Global Positioning System (GPS) comprising:

determining a to-be-tracked target in a first monitoring image shot by a first camera;

controlling the first camera to track the to-be-tracked target, and to obtain GPS coordinates of the to-be-tracked target during the tracking;

predicting a camera by which the to-be-tracked target is to pass based on the GPS coordinates of the to-be-tracked target obtained during the tracking, and taking the predicted camera as a second camera; and sending the GPS coordinates of the to-be-tracked target to the second camera so that the second camera tracks the to-be-tracked target according to the GPS coordinates of the to-be-tracked target;

wherein obtaining GPS coordinates of the to-be-tracked target during the tracking comprises:

obtaining Pan/Tilt (PT) coordinates for the first camera to capture the to-be-tracked target during the tracking, and converting the PT coordinates into the GPS coordinates of the to-be-tracked target; and wherein converting the PT coordinates into the GPS coordinates of the to-be-tracked target comprises:

obtaining the PT coordinates for the first camera to capture the to-be-tracked target, and taking the P coordinates of the PT coordinate as a first P coordinate and taking the T coordinate of the PT coordinates as a first T coordinate;

determining a horizontal angle between the to-be-tracked target and a specified direction based on the first P coordinate;

calculating a horizontal distance between the to-be-tracked target and the first camera based on the first T coordinate and the height of the first camera;

calculating, according to the horizontal angle and the horizontal distance, a longitudinal distance and a latitudinal distance between the to-be-tracked target and the first camera through trigonometric functions; and calculating the GPS coordinates of the to-be-tracked target based on the longitude and latitude of the first camera, and the longitudinal distance and latitudinal distance.

10. The method according to claim 9, wherein determining a to-be-tracked target in a first monitoring image shot by a first camera comprises:

receiving attribute information of the to-be-tracked target sent by a server or a camera other than the first camera; and determining the to-be-tracked target in the first monitoring image based on the attribute information;

after predicting a camera by which the to-be-tracked target is to pass based on the GPS coordinates of the to-be-tracked target obtained during the tracking, and taking the predicted camera as a second camera; the method further comprises:

sending the attribute information to the second camera so that the second camera detects, based on the received attribute information, the to-be-tracked target in a second monitoring image shot by the second camera.

11. The method according to claim 9, wherein controlling the first camera to track the to-be-tracked target comprises:

receiving attribute information of the to-be-tracked target sent by a server or a camera other than the first camera;

determining PT coordinates for the first camera to capture the to-be-tracked target according to received GPS coordinates of the to-be-tracked target; and adjusting a shooting angle of the first camera based on the PT coordinates.

12. The method according to claim 11, wherein determining PT coordinates for the first camera to capture the to-be-tracked target according to received GPS coordinates of the to-be-tracked target comprises:

calculating a longitudinal distance and a latitudinal distance between the first camera and the to-be-tracked target according to the GPS coordinates of the to-be-tracked target and GPS coordinates of the first camera that captures the to-be-tracked target;

calculating a horizontal distance between the to-be-tracked target and the first camera according to the longitudinal distance and latitudinal distance;

calculating a horizontal angle between the to-be-tracked target and a specified direction through trigonometric functions according to the longitudinal distance and latitudinal distance;

determining the P coordinate of the first camera according to the horizontal angle; and calculating the T coordinate of the first camera according to the horizontal distance and the height of the first camera.

13. A dome camera, comprising:

an image acquirer configured for shooting monitoring images;

a memory configured for storing a computer program; and a processor configured for implementing the method steps of claim 9 when executing the program stored in the memory.

\* \* \* \* \*